June 22, 1965    A. N. ORMOND    3,190,108

STABILIZED PLATENS

Filed March 20, 1961

INVENTOR.
ALFRED N. ORMOND
BY
Elliott & Pastoriza
ATTORNEYS

3,190,108
STABILIZED PLATENS
Alfred N. Ormond, 11969 E. Slauson,
Santa Fe Springs, Calif.
Filed Mar. 20, 1961, Ser. No. 96,797
1 Claim. (Cl. 73—1)

This invention relates to force isolating structures for use in measuring and calibrating force components developed in relatively large masses. More particularly, it has to do with novel structure in the form of stabilized platens for isolating or rendering ineffective various force components and moments to the end that only a desired given force is transmitted either for measuring or calibrating purposes.

While the stabilized platens of this invention have many applications, their preferred use is in conjunction with calibrating load cells in a multi-component test stand such as used for rocket motors, for example, and for purposes of illustration, the invention will be discussed in this connection.

In the testing of rocket motors, the motor itself may be mounted in a test stand in such a manner that six individual force components corresponding to the six degrees of freedom of a given body may be measured. Thus, the motor supports include three load cells positioned to measure, for example, the thrust, side forces, and vertical forces which are all directed in mutually perpendicular directions. Also, three moment measuring load cells are provided to measure roll, yaw, and pitch. The rocket motor must be suspended in such a manner that the individual components may be measured with a minimum of interaction between the various components. For example, in order to obtain an accurate measurement of thrust, it is important to isolate any forces or moments as a consequence of the presence of the other five components.

For greatest accuracy, the load cells for the rocket motor should be calibrated in place. If, however, a calibrator is attached to calibrate the thrust load cell, for example, the stiffness or redundancy with respect to the other five components is altered as a consequence of this physical connection. To overcome this deficiency, it would be desirable to provide a structure through which no component of force or moment can be transmitted except the desired component, for example, the component along a given direction corresponding to the thrust axis when thrust calibration is being carried out.

With the foregoing in mind, it is accordingly a primary object of this invention to provide an isolating structure or stabilized platen in which a force may be transmitted only in a given direction and all other force components in directions different from said given direction isolated to the end that the overall stiffness of the particular test stand system with respect to the other load cells is not altered when a calibrating load cell is connected to the system.

Another object is to provide a force transmitting means in which only forces in a given direction can be transmitted and which includes an inherent self-compensating feature such that stiffness of the structure is neutralized so that effectively a "zero rate" spring motion is provided.

Another object is to provide a force transmitting member in which the motion thereof is constrained to a precise rectilinear direction so that in certain applications, normal and inverted pendulum effects are eliminated.

Briefly, these and other objects and advantages of this invention are attained by providing a stabilized platen structure in the form of a force transmitting member having first and second flexure supports secured thereto at spaced points in line with the desired given direction of force transmission. These flexure supports extend in a direction parallel to each other and normal to said given direction. The free ends terminate in a tie plate. The force transmitting member or force plate together with the tie plate and first and second flexure supports define generally a parallelogram structure such that motion of the force plate is confined to the desired given direction, and any force components or moments in other directions are completely isolated and thus prevented from passing through the force plate.

In one embodiment, the lower tie plate is secured to a stationary structure such as ground or a stationary frame constituting part of the test stand. In a second embodiment, the structure includes additional flexure supports extending upwardly from the tie plate to terminate in a stationary structure constituting ground or part of the test stand in a position substantially co-planar with the force plate. The tie plate thus is "floating," and the arrangement is such that the given direction of motion of the force plate is precisely rectilinear.

In the use of this structure, the stabilized platens are connected between a calibration load cell and a suitable connecting structure passing to the rocket motor for transmitting force to the rocket motor.

A better understanding of the invention and more particularly of its preferred application will be had by now referring to the accompanying drawings, in which.

Figure 1:
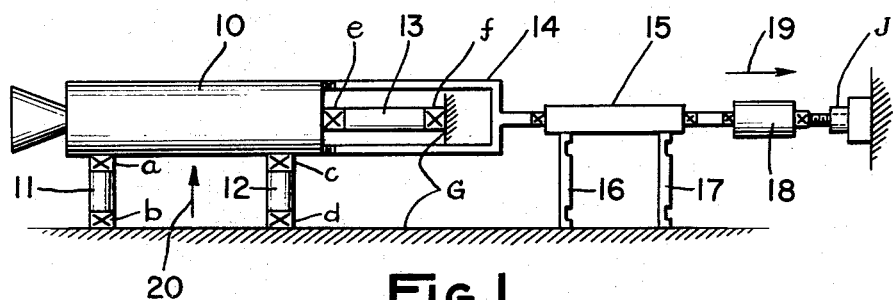
FIGURE 1 is a schematic diagram illustrating one application of the stabilized platen of this invention in the calibration of a thrust load cell for a rocket motor in a test stand.

Referring first to FIGURE 1, there is illustrated merely by way of example, a rocket motor 10 supported in a test stand by suitable load cells 11, 12, and 13, secured to ground G which may constitute a stationary frame structure. As shown, the ends of the respective load cells are connected through flexure pivots such as indicated by the letters $a$, $b$; $c$, $d$; and $e$, $f$, respectively. The load cells 11 and 12 may be employed to measure lateral or up and down forces on the rocket motor 10 or even to measure pitching movement of the rocket motor by a combination of the readings of the load cells. The load cell 13, on the other hand, is designed to measure thrust and towards this end is axially aligned with the longitudinal thrust axis of the motor 10.

Assuming it is desired to calibrate the thrust load cell 13, a known force in the direction of the thrust axis is applied to the motor 10 and readings of the load cell 13 taken. For this purpose, there is provided a force transmitting frame 14 connected through a force plate 15 supported on first and second flexure supports 16 and 17. The other end of the force plate 15 in turn connects to a calibrating load cell 18 which will measure a force supplied by a jack J, for example, in the direction indicated by the arrow 19. Suitable flexure pivots for the frame 14, force plate 15, and calibrating load cell 18 are provided as shown and are similar in structure to the flexure pivots $a$ through $f$.

The force plate 15 and first and second flexure supports 16 and 17 constitute one embodiment of the stabilized platen of this invention. Essentially, this structure serves to isolate all forces between the calibrating load cell 18 and the frame structure 14 and thus the rocket motor 10 except the force transmitted along the given direction of the thrust axis which is the only force to be calibrated.

To appreciate the significance of the stablized platen structure, consider first the results of connecting the calibrating load cell 18 directly to the structure 14. In this event, if a lateral force were exerted on the rocket motor 10 such as indicated by the arrow 20 in order to calibrate the load cells 11 and 12, the presence of the frame structure 14 in conjunction with the calibrating load cell 18 would change the overall stiffness of the system and the readings of the load cells 11 and 12 would thus be different from those obtained when the load cell 18 was disconnected from the frame 14.

If instead, the force plate 15 of the stabilized platen structure including the flexure supports 16 and 17 is connected to the frame 14 and the load cell 18 then connected to the force plate 15 as shown in FIGURE 1, a given reading on the load cells 11 and 12 when calibrating a lateral force will remain the same whether or not the load cell 18 is connected to the right hand end of the force plate 15. This is because the force plate 15 isolates all forces except those in the direction of the thrust axis. The platen may thus remain in the system and its stiffness will become a part of the other readings. These other readings, however, will be consistent whether or not the load cell 18 is connected to the platen.

Figure 2:
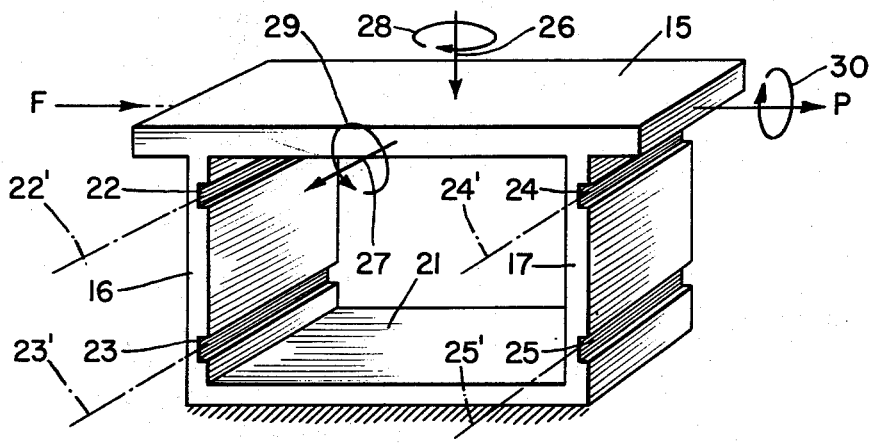
FIGURE 2 is an enlarged perspective view of the stabilized platen illustrated in FIGURE 1; and, FIGURE 3 illustrates a second embodiment of the invention which could be used in the test stand configuration of FIGURE 1.

Referring now to FIGURE 2, the manner in which the desired force component isolation is achieved by the stabilized platen of FIGURE 1 will be understood. In FIGURE 2, it will be noted that the force plate 15 is arranged to transmit the pull force P exerted on the right-hand end of the force plate 15 to a corresponding simulated thrust force F at the lefthand end of the plate in a given direction which in FIGURE 2 is horizontal. The first and second flexure supports 16 and 17 extend normally from this given direction generally in parallel directions to each other. The lower ends are connected together by a tie plate 21 which is secured to a stationary structure such as ground G. The terminal connections of the first and second flexure supports 16 and 17 are spaced apart a distance equal to the distance between the locations of the upper connections to the force plate 15 so that the force plate 15 together with the tie plate 21 and flexure supports define generally a parallelogram.

As shown in FIGURE 2, each of the flexure supports includes upper and lower flexure webs such as indicated at 22 and 23 for the support 16 and 24 and 25 for the support 17. The bending axes for these flexure webs are indicated at 22', 23', 24', and 25' and as is evident from FIGURE 2, these bending axes are generally parallel to each other and normal to the direction of the flexure supports 16 and 17 between the force plate 15 and tie plate 21.

From the foregoing structure, it will be evident that movement of the force plate 15 is constrained to an horizontal direction as viewed in FIGURE 2 corresponding to the directions of the force designations F and P. All other forces or moments are isolated. For example, any vertical force such as in the direction of the arrow 26 is borne in compression by the flexure supports 16 and 17. Any lateral force such as indicated by the arrow 27 is also borne by the flexures 16 and 17 as a consequence of their relatively wide width. Similarly, force moments such as indicated by the arrows 28, 29, and 30 are respectively absorbed within the flexure supports so that the only force which can be transmitted is in the given direction corresponding to the direction of the arrows F and P.

It will be evident that any movement of the force plate from left to right, or from right to left, will be opposed by the spring stiffness of the various flexure webs 22 through 25. It is possible to weight the force plate in such a manner that the inverted pendulum effect will result in the generation of forces which will exactly cancel the stiffness forces exerted by the flexure webs. By so weighting the force plate 15, the movement of the force plate in the given direction of force transmission will not add or subtract from the particular force being transmitted. In other words, F will remain equal to P for any given position of the force plate 15, the plate 15 exhibiting essentially a "zero spring" rate.

Figure 3:
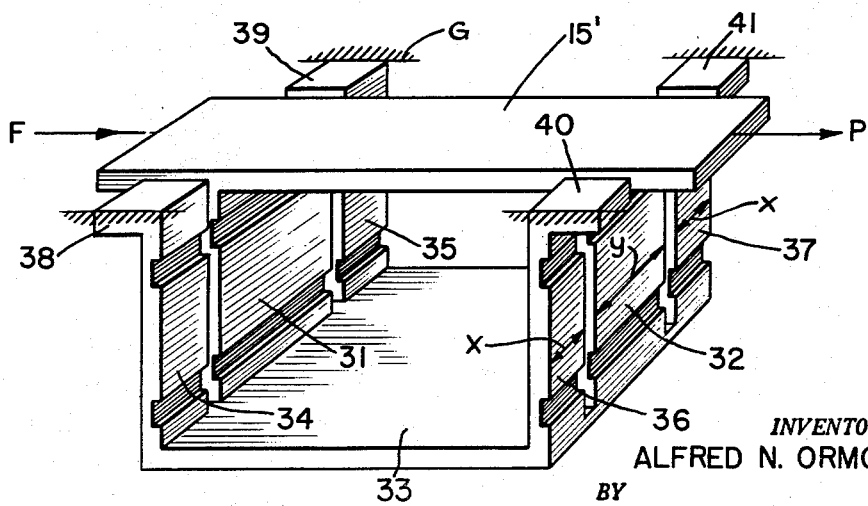

In other instances, it may be desirable to avoid any pendulum effect since the pendulum effect can only operate if there is a slight vertical displacement of the force plate during its horizontal movement when oriented as shown in FIGURE 2. Thus, in order to realize a perfect rectilinear movement wherein there is no depression or elevation of the force plate 15 when moved horizontally, a modified platen structure may be employed as illustrated in FIGURE 3. In FIGURE 3, the force plate is designated 15' and is again supported by first and second flexures 31 and 32, the lower terminal ends of which are connected together by a tie plate 33. In FIGURE 3, the tie plate 33 is wider than the flexure supports 31 and 32 and can thus accommodate pairs of flexures 34 and 35, and 36 and 37 on either side of the first and second flexures 31 and 32. These additional flexures extend in an opposite direction to the flexures 31 and 32 to terminate at stationary structural points 38 and 39, 40 and 41, generally on the same level or coplanar with the force plate 15'.

The flexure webs of the additional flexure supports 34 through 37 are co-planar with the flexure webs in the basic first and second flexure supports 31 and 32. Further, the width of each of the additional flexure webs indicated at $x$ are each made equal to one-half the width of the first and second flexure supports 31 and 32 indicated at $y$. Since there are twice as many additional flexure supports, each of half the widths of the first and second flexure supports the overall stiffness of the flexure supports 31 and 32 is equal to the overall stiffness of the flexure supports 34, 35, 36, and 37.

With the foregoing structure and the stabilized plate secured to a stationary structure through the supports 38, 39, 40, and 41, a folded flexure support structure is provided wherein horizontal movement of the force plate 15' will be constrained to an exact rectilinear path, there being no elevation or lowering of the plate 15' when movement takes place. This result is achieved by permitting the lower tie plate 33 to "float"; that is, any elevation or lowering movement as a consequence of bending of the flexures will be reflected in the tie plate rather than the force plate 15'. Thus, when the force plate 15' moves to the left or right in a horizontal direction, the tie plate 33 will be brought slightly closer to the force plate 15 in the manner of a collapsing parallelogram with the top side of the parallelogram held at a given level so that the under side swings up towards or away from the top side during movement.

The folded stabilized platen structure of FIGURE 3 is used when it is necessary that the force transmitting plate 15' move in an exactly rectilinear path in order to avoid the introduction of any spurious forces.

From the foregoing description, it will be evident that the present invention has provided novel means for increasing the accuracy of testing and calibrating rocket motors in a test stand. While only the one specific application of the invention has been set forth and described, the stabilized platens are not to be thought of as limited to this one function.

What is claimed is:

A stabilized platen structure for transmitting a force of large magnitude as exists in rocket engine testing between end points in a rectilinear path of given direction wherein said force is isolated from any force components in directions other than said given direction, comprising, in combination: a flat force and motion transmitting plate extending between said end points with the ends of said plate coinciding with said end points; a tie plate in spaced parallel relationship to said force plate; first and second support means secured at upper ends to said force plate at locations spaced along said given direction and at lower ends to said tie plate at locations spaced along a line parallel to said given direction corresponding to the spacing between said first mentioned locations to define a parallelogram type structure, each of said support means including upper and lower flexure webs co-planar with each other and lying in a plane normal to said given direction, said flexure webs being respectively positioned adjacent to the points of securement of said support means to said force plate and tie plate respectively for flexing movement about parallel axes lying in said plane and parallel to said force plate; and two pairs of additional support means, the support means of one pair being positioned on either side of said first support means with their lower ends secured to said tie plate and their upper ends secured to a stationary structure co-planar with said force plate; and the support means of the other pair being positioned on either side of said second support means with their lower ends secured to said tie plate and their upper ends secured to a stationary structure co-planar with said force plate, each of said additional support means including flexure webs adjacent their upper and lower ends co-planar and at corresponding levels with the flexure webs of said first mentioned first and second support means respectively, and being of one half the width of the flexure webs in said first mentioned support means whereby the total stiffness of said first and second support means equals the total stiffness of said additional support means and whereby said force plate is constrained for movement only in said given direction.

References Cited by the Examiner

UNITED STATES PATENTS

| | | | |
|---|---|---|---|
| 2,085,687 | 6/37 | Peters | 33—147 |
| 2,976,734 | 3/61 | Gindes et al. | 73—517 X |
| 2,997,875 | 8/61 | Moore | 73—141 |

ISAAC LISANN, *Primary Examiner.*